US012074335B2

United States Patent
Liao et al.

(10) Patent No.: US 12,074,335 B2
(45) Date of Patent: Aug. 27, 2024

(54) BATTERY MODULE, BATTERY PACK, POWERED DEVICE, AND ASSEMBLY METHOD FOR BATTERY MODULE

(71) Applicant: CONTEMPORARY AMPEREX TECHNOLOGY CO., LIMITED, Ningde (CN)

(72) Inventors: Xiping Liao, Ningde (CN); Haidong Zhang, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 659 days.

(21) Appl. No.: 17/123,027

(22) Filed: Dec. 15, 2020

(65) Prior Publication Data
US 2021/0104800 A1 Apr. 8, 2021

Related U.S. Application Data

(63) Continuation of application No. PCT/CN2020/104708, filed on Jul. 26, 2020.

(30) Foreign Application Priority Data

Aug. 9, 2019 (CN) .......................... 201921285749.X (51) Int. Cl.
*H01M 10/613* (2014.01)
*H01M 10/625* (2014.01)
(Continued)

(52) U.S. Cl.
CPC ....... *H01M 50/249* (2021.01); *H01M 10/613* (2015.04); *H01M 10/625* (2015.04);
(Continued)

(58) Field of Classification Search
CPC ............. H01M 50/204; H01M 50/262; H01M 50/289; B60K 1/04; B60K 2001/005;
(Continued)

(56) References Cited

U.S. PATENT DOCUMENTS 9,356,328 B2    5/2016  Siering et al.
2014/0193686 A1 7/2014  Siering et al.
(Continued)

FOREIGN PATENT DOCUMENTS

CN    103650200 A      3/2014
CN    104859717 A  *   8/2015
(Continued)

OTHER PUBLICATIONS

Guo, CN-104859717 MT (Year: 2015).*
(Continued)

*Primary Examiner* — Ula C Ruddock
*Assistant Examiner* — Anna Korovina
(74) *Attorney, Agent, or Firm* — Kilpatrick Townsend & Stockton LLP (57) ABSTRACT

This application provides a battery module and an assembly method for a battery module. The battery module includes batteries and a framework assembly. The framework assembly includes a first partition, two second partitions, and a securing clip. The first partition extends in a second direction. Each second partition extends in a first direction, and the two second partitions are located respectively on two sides of the first partition and form a cross-shaped structure together with the first partition. The securing clip fits with the two second partitions and secures the two second partitions to the first partition. The batteries are disposed on two sides of each second partition of the framework assembly in the second direction. The two second partitions of the framework assembly are secured to the first partition by
(Continued)

using the securing clip, thereby improving the strength of connection between the second partitions and the first partition.

18 Claims, 10 Drawing Sheets

(51) Int. Cl.
   *H01M 10/655* (2014.01)
   *H01M 50/204* (2021.01)
   *H01M 50/249* (2021.01)
   *H01M 50/262* (2021.01)

(52) U.S. Cl.
   CPC ....... *H01M 10/655* (2015.04); *H01M 50/204* (2021.01); *H01M 50/262* (2021.01); *H01M 2220/20* (2013.01)

(58) Field of Classification Search
   CPC ........ Y02E 60/10; B62D 21/08; B62D 25/20; B60L 58/26; F16B 7/18; F16B 7/187; F16B 7/0493; F16B 7/0413; F16B 7/0446; F16B 7/042; F16B 7/044; F16B 7/1472; F16B 7/185; F16B 9/056; F16B 9/058
   See application file for complete search history.

(56) References Cited

U.S. PATENT DOCUMENTS

| | | | | |
|---|---|---|---|---|
| 2016/0268657 | A1* | 9/2016 | Park | H01M 10/6556 |
| 2020/0189378 | A1* | 6/2020 | Hirsch | B62D 25/2072 |
| 2020/0203784 | A1 | 6/2020 | Shimizu et al. | |
| 2020/0295322 | A1 | 9/2020 | Gunther | |

FOREIGN PATENT DOCUMENTS

| | | | | |
|---|---|---|---|---|
| CN | 106207029 | A | 12/2016 | |
| CN | 106601958 | A * | 4/2017 | H01M 2/1072 |
| CN | 207607543 | U | 7/2018 | |
| CN | 109921144 | A | 6/2019 | |
| CN | 210576067 | U | 5/2020 | |
| DE | 102016113481 | A1 | 1/2018 | |
| DE | 102017206988 | A1 * | 10/2018 | B60K 1/04 |
| DE | 102017110978 | A1 * | 11/2018 | |
| DE | 102017005328 | A1 | 12/2018 | |
| DE | 102017005329 | A1 | 12/2018 | |
| JP | 2015117055 | A | 6/2015 | |
| WO | WO2018158340 | A1 | 9/2018 | |
| WO | WO2019151037 | A1 | 8/2019 | |

OTHER PUBLICATIONS

Yang, CN-106601958 MT (Year: 2017).*
Kellner, DE-102017110978 MT (Year: 2018).*
Contemporary Amperex Technology Co., Limited, Extended European Search Report, EP20817182.7, Jul. 26, 2021, 8 pgs.
Contemporary Amperex Technology Co., Limited, International Search Report and Written Opinion, PCTCN2020104708, Oct. 28, 2020, 19 pgs.

* cited by examiner

BATTERY MODULE, BATTERY PACK, POWERED DEVICE, AND ASSEMBLY METHOD FOR BATTERY MODULE

CROSS REFERENCE TO RELATED APPLICATIONS

This application is a continuation application of PCT Patent Application No. PCT/CN2020/104708, entitled "BATTERY MODULE, BATTERY PACK, POWERED DEVICE, AND ASSEMBLY METHOD FOR BATTERY MODULE" filed on Jul. 26, 2020, which claims priority to Chinese Patent Application No. 201921285749.X, filed with the State Intellectual Property Office of the People's Republic of China on Aug. 9, 2019, and entitled "BATTERY MODULE", all of which are incorporated herein by reference in their entirety.

TECHNICAL FIELD

This application relates to the field of traction batteries, and in particular to a battery module, a battery pack, a powered device, and an assembly method for a battery module.

BACKGROUND

A battery module usually includes a plurality of batteries, a first partition, and two second partitions, and the two second partitions are located respectively on two sides of the first partition and form a cross-shaped structure together with the first partition. The plurality of batteries are disposed on two sides of each second partition. At present, in a conventional battery module, to facilitate connection, the second partitions are usually fixedly connected to the first partition by using a structural adhesive. However, due to the low connection strength in such a connection manner, an adhesive layer easily loses its function when the battery module is subjected to vibration and shock. As a result, the second partitions break away from the first partition, and the overall strength of the battery module is greatly reduced.

SUMMARY

In view of the problem in the background, an objective of this application is to provide a battery module, a battery pack, a powered device, and an assembly method for a battery module, so as to improve the strength of connection between second partitions and a first partition of a framework assembly, and then improve the overall connection strength of the battery module.

To achieve the foregoing objective, according to a first aspect, a battery module is provided, including a plurality of batteries and a framework assembly. The framework assembly includes a first partition, two second partitions, and a securing clip. The first partition extends in a second direction. Each second partition extends in a first direction, and the two second partitions are located respectively on two sides of the first partition and form a cross-shaped structure together with the first partition. The securing clip fits with the two second partitions and secures the two second partitions to the first partition. The plurality of batteries are disposed on two sides of each second partition of the framework assembly in the second direction.

Each second partition has a second body portion and a connection portion, the connection portion is located between the first partition and the second body portion in the first direction, and a first cavity is formed in the connection portion. The securing clip has a third body portion and two extension portions, each extension portion is connected to the third body portion and extends in a third direction, and the two extension portions are spaced apart in the first direction and form a groove together with the third body portion. The third body portion is located above the connection portions of the two second partitions, the two extension portions are accommodated in respective first cavities formed in the connection portions of the two second partitions, and the first partition passes through the groove in the second direction.

A second stepped surface is formed inside the first cavity of the connection portion. A first stepped surface is formed inside each extension portion, and the first stepped surface abuts against the second stepped surface in the third direction.

A notch is provided in a part of the first partition corresponding to the securing clip, and the third body portion of the securing clip is accommodated in the notch.

The framework assembly further includes a heat exchange plate, the heat exchange plate is located below the first partition in the third direction, and a channel is formed in the heat exchange plate. The securing clip fits with the heat exchange plate, so as to mount the heat exchange plate.

The first partition has a first body portion and a mounting portion. The first body portion extends in the third direction, and the mounting portion is connected to the first body portion and extends in the first direction. A mounting slot is provided in the heat exchange plate, and the mounting slot accommodates the mounting portion of the first partition.

The heat exchange plate includes a first plate and a second plate, and the second plate is located below the first plate in the third direction and forms the channel together with the first plate. The second plate is formed as a wave-like structure.

The heat exchange plate has position locking holes. The securing clip further has one or more position locking portions, each position locking portion disposed below the extension portion in the third direction, and the position locking portion is accommodated in the position locking hole of the heat exchange plate.

The position locking portion is formed as a tapered structure.

The position locking portions are disposed in pairs, and a pair of position locking portions are respectively disposed below the two extension portions, and the pair of position locking portions are staggered in the first direction.

The framework assembly further includes a connector, the connector is secured to the heat exchange plate, and the connector is configured to connect the channel to an external heat-conducting medium storage apparatus.

According to a second aspect, a battery pack is provided, including the battery module according to any one of the foregoing implementations.

According to a third aspect, a powered device is provided, including the battery module according to any one of the foregoing implementations.

According to a fourth aspect, an assembly method for a battery module, including: providing a plurality of batteries and a framework assembly, where the framework assembly includes a first partition, two second partitions, and a securing clip; placing the first partition in a second direction; mounting the second partitions respectively on two sides of the first partition in a first direction, where the second partitions form a cross-shaped structure together with the first partition; fitting the securing clip to the two second partitions and the first partition, so that the securing clip secures the two second partitions to the first partition; and disposing the plurality of batteries on two sides of each second partition in the second direction.

In some embodiments, a first cavity is provided in each second partition, and the securing clip has two extension portions and a groove located between the two extension portions; the step of fitting the securing clip to the two second partitions and the first partition, so that the securing clip secures the two second partitions to the first partition, further includes: inserting the two extension portions of the securing clip into respective cavities of the two second partitions; and inserting the first partition into the groove.

In some embodiments, a heat exchange plate is provided; and the heat exchange plate is connected below the first partition in a third direction, where a channel is formed in the heat exchange plate.

In some embodiments, a connector is provided; and the connector is connected to the heat exchange plate, where the connector communicates with the channel.

In the battery module of this application, the two second partitions of the framework assembly are secured to the first partition by using the securing clip, and this connection manner is simple and reliable, thereby facilitating assembly of the framework assembly 1 and improving the strength of connection between the second partitions and the first partition. When the battery module is subjected to vibration and shock, the second partition does not easily break away from the first partition under the action of the securing clip, thereby improving the overall structural strength of the battery module.

| Reference numerals: | |
|---|---|
| 1. Framework assembly | 134. Position locking portion |
| 11. First partition | 14. Heat exchange plate |
| 111. First body portion | 141. Channel |
| 112. Mounting portion | 142. Mounting slot |
| 113. Notch | 143. Position locking hole |
| 12. Second partition | 14A. First plate |
| 121. Second body portion | 14B. Second plate |
| 1211. Second cavity | 15. Side plate |
| 122. Connection portion | 16. End plate |
| 1221. Second stepped surface | 17. Connector |
| 1222. First cavity | 18. Top cover |
| 13. Securing clip | 2. Battery |
| 131. Third body portion | X. First direction |

| -continued | |
|---|---|
| Reference numerals: | |
| 132. Extension portion | Y. Second direction |
| 1321. First stepped surface | Z. Third direction |
| 133. Groove | |

DESCRIPTION OF EMBODIMENTS

To make the objectives, technical solutions, and advantages of this application clearer, this application is further described below in detail with reference to the accompanying drawings and embodiments. It should be understood that specific embodiments described herein are merely intended to explain this application, rather than limiting this application.

In the descriptions of this application, unless otherwise specified and defined explicitly, the terms "first", "second", and "third" are merely intended for a purpose of description, and should not be understood as any indication or implication of relative importance, and the term "plurality of" means at least two (including two). Unless otherwise specified and defined explicitly, the term "connection" should be understood in its general sense. For example, the "connection" may be a fixed connection, a detachable connection, an integrated connection, an electrical connection, or a signal connection; and may be a direct connection, or an indirect connection through an intermediate medium. A person of ordinary skill in the art can understand specific meanings of these terms in this application based on specific situations.

In the descriptions of the specification, it should be understood that the directional terms such as "above" and "below" described in the embodiments of this application are described as seen from the angles shown in the accompanying drawings, and should not be understood as a limitation to the embodiments of this application. The application is further described in detail below through the specific embodiments with reference to the accompanying drawings.

Figure 1:
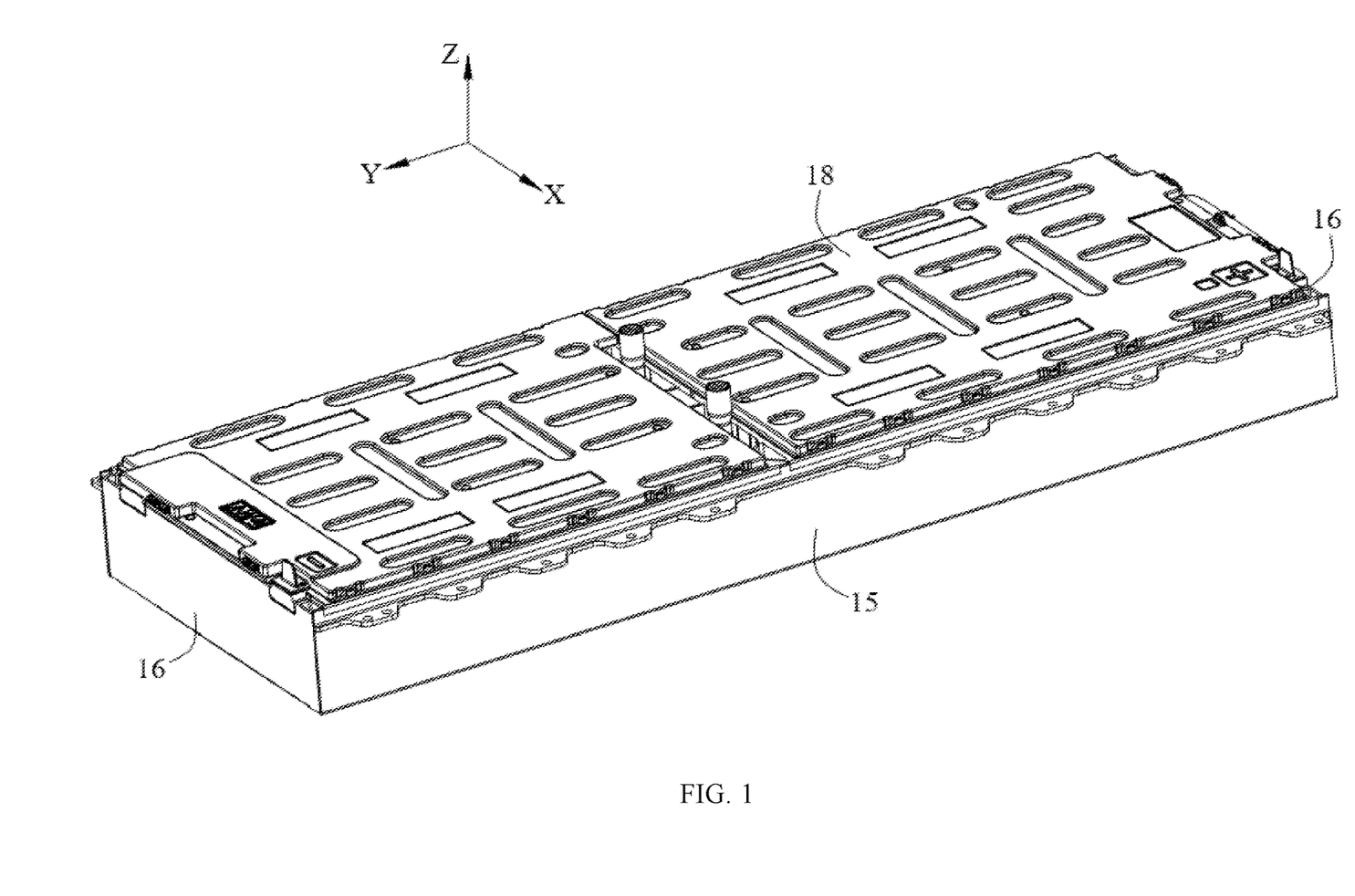
FIG. 1 is a three-dimensional diagram of a battery module in this application.
Figure 2:
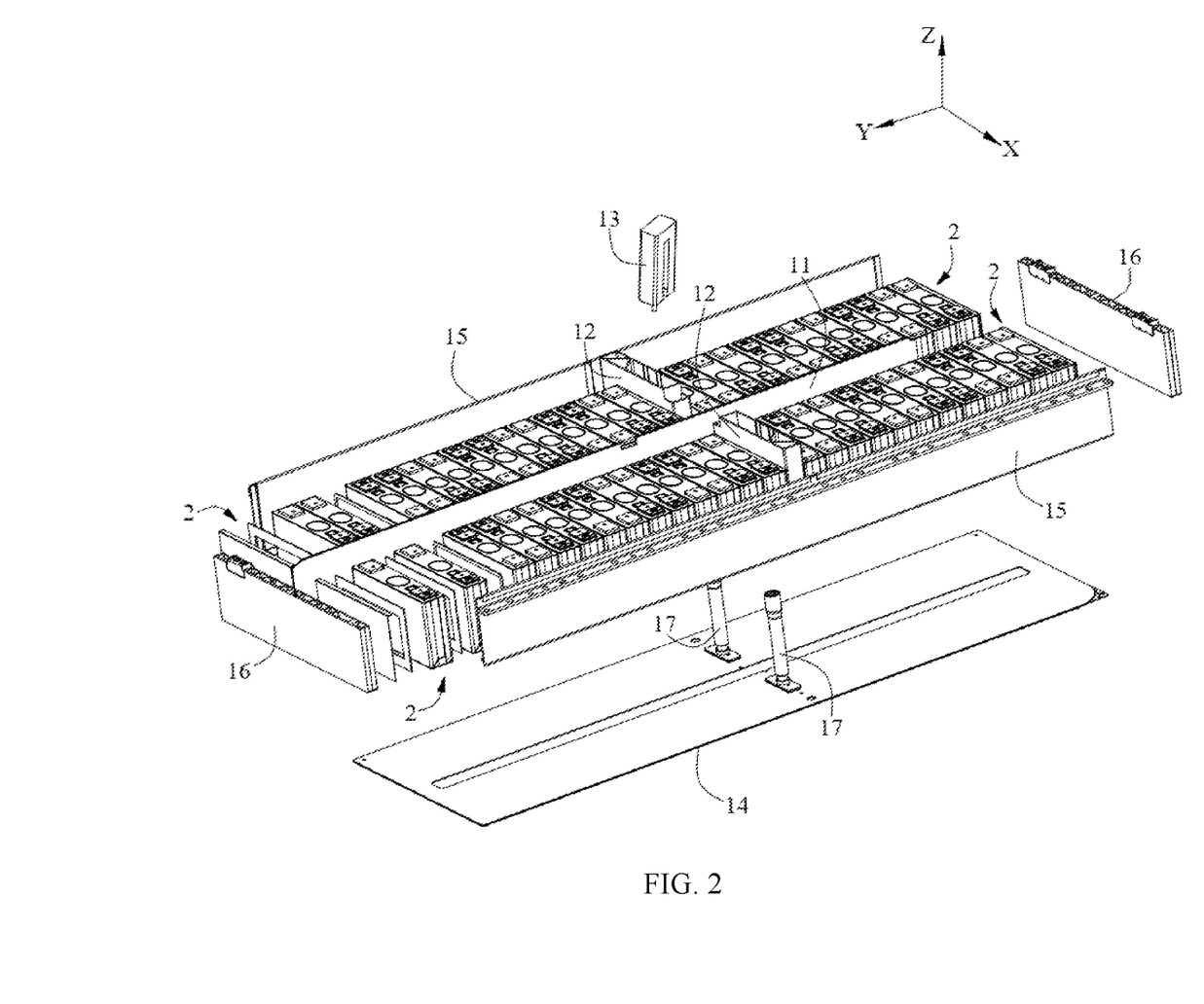
FIG. 2 is an exploded view of FIG. 1, in which a top cover is omitted for clarity.

Referring to FIG. 1 and FIG. 2, a battery module in this application includes a framework assembly 1 and a plurality of batteries 2, and the framework assembly 1 accommodates and firmly clamps the plurality of batteries 2.

Referring to FIG. 1 to FIG. 10, the framework assembly 1 may include a first partition 11, two second partitions 12, a securing clip 13, two side plates 15, two end plates 16, and a top cover 18. Depending on an actual situation, the framework assembly 1 may further include a heat exchange plate 14 and a connector 17.

Figure 3:
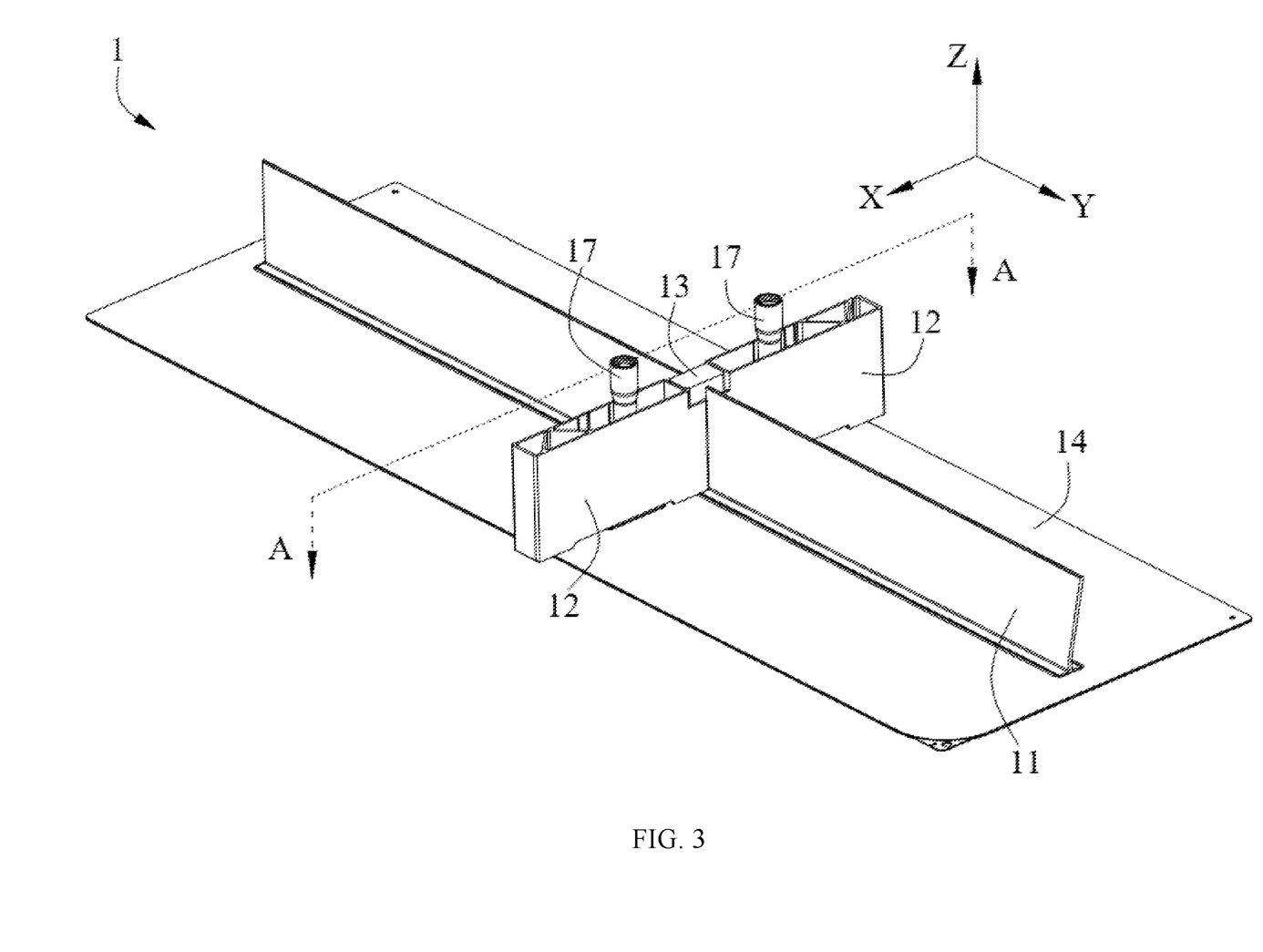
FIG. 3 is a three-dimensional diagram of a framework assembly of a battery module, in which a top cover, two side plates, and two end plates are omitted for clarity.
Figure 4:
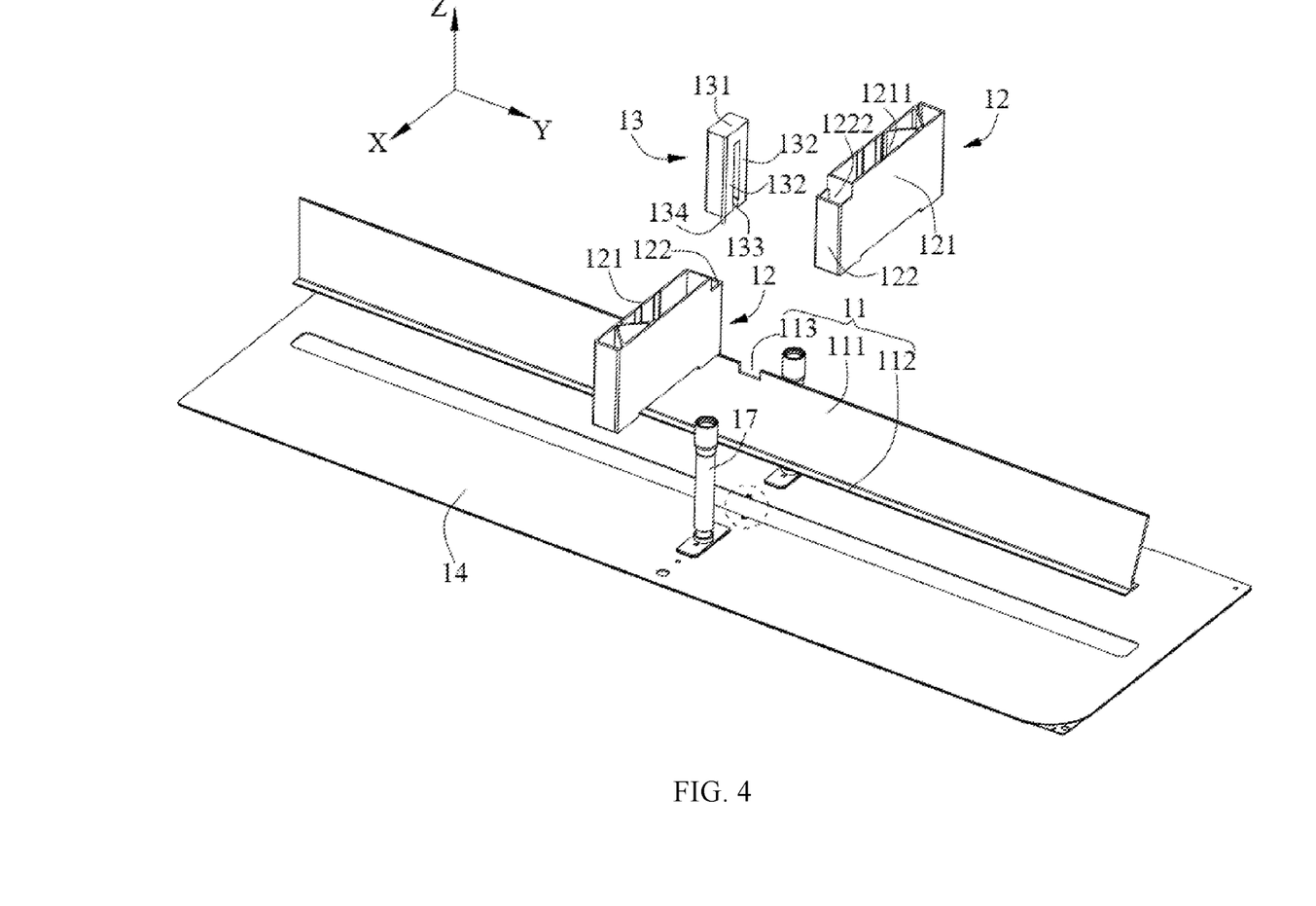
FIG. 4 is an exploded view of FIG. 3.
Figure 5:
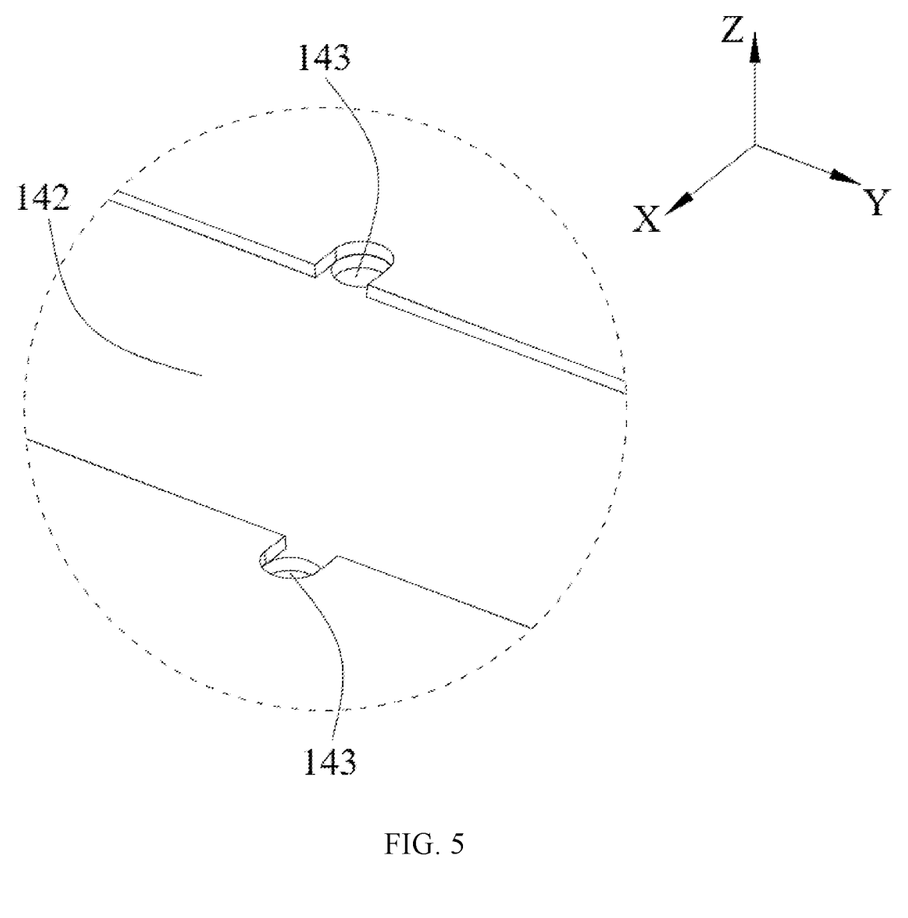
FIG. 5 is an enlarged view of to a circled part in FIG. 4.

The first partition 11 extends in a second direction Y, each second partition 12 extends in a first direction X, and the two second partitions 12 are located respectively on two sides of the first partition 11 in the first direction X and form a cross-shaped structure together with the first partition 11. The securing clip 13 fits with the two second partitions 12, to secure the two second partitions 12 to the first partition 11.

Each side plate 15 extends in the second direction Y, and the two side plates 15 are located respectively on two sides of the two second partitions 12 in the first direction X. Each end plate 16 extends in the first direction X, and the two end plates 16 are located respectively on two sides of the first partition 11 in the second direction Y and may be fixedly connected to the two side plates 15 by welding. In this way, the two side plates 15 and the two end plates 16 together with the first partition 11 and the two second partitions 12 firmly clamp the plurality of batteries 2. It should be noted that, in this application, alternatively, a strap may be used to replace the two side plates 15 and the two end plates 16 to achieve the purpose of firmly clamping the plurality of batteries 2.

Referring to FIG. 1, the top cover 18 is located above the plurality of batteries 2 and fitted to the two side plates 15 and the two end plates 16.

Referring to FIG. 2, the plurality of batteries 2 may be disposed into four battery units, and a plurality of batteries 2 in each battery unit are disposed side by side in the second direction Y between the second partition 12 and a corresponding end plate 16.

In the battery module of this application, the two second partitions 12 of the framework assembly 1 are secured to the first partition 11 by using the securing clip 13, and this connection manner is simple and reliable, thereby facilitating assembly of the framework assembly 1 and improving the strength of connection between the second partitions 12 and the first partition 11. When the battery module is subjected to vibration and shock, the second partition 12 does not easily break away from the first partition 11 under the action of the securing clip 13, thereby improving the overall structural strength of the battery module.

Figure 9:
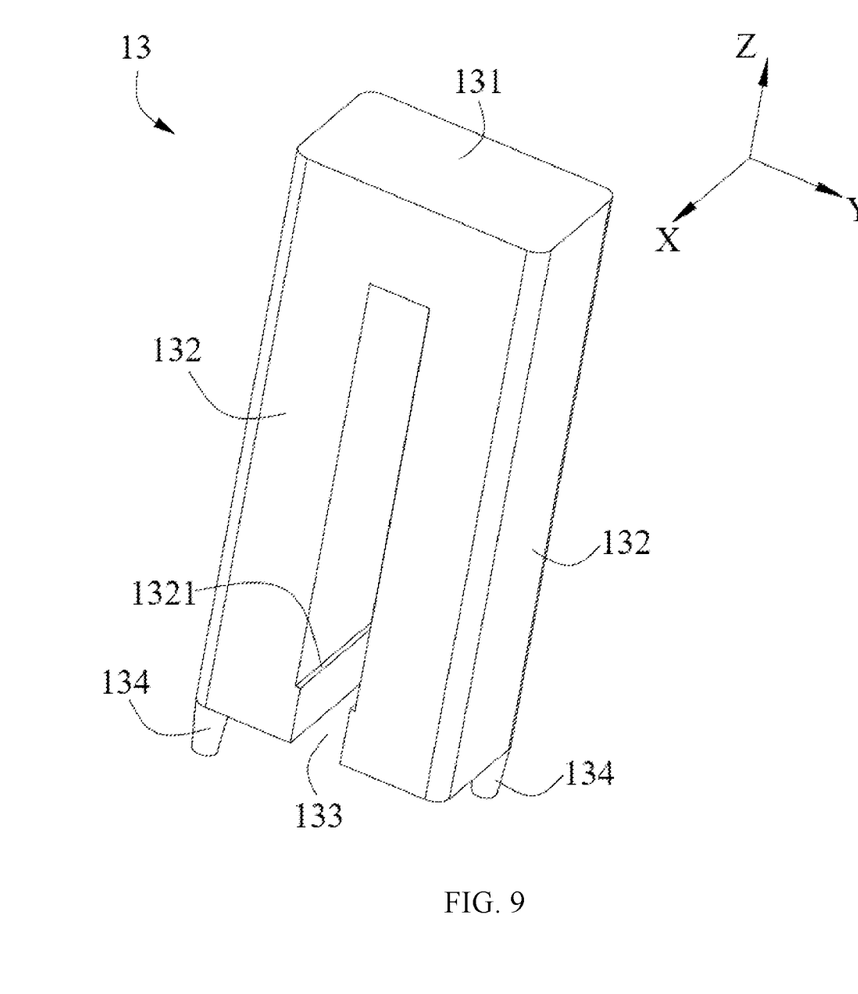
FIG. 9 is a three-dimensional diagram of a securing clip in a framework assembly.
Figure 10:
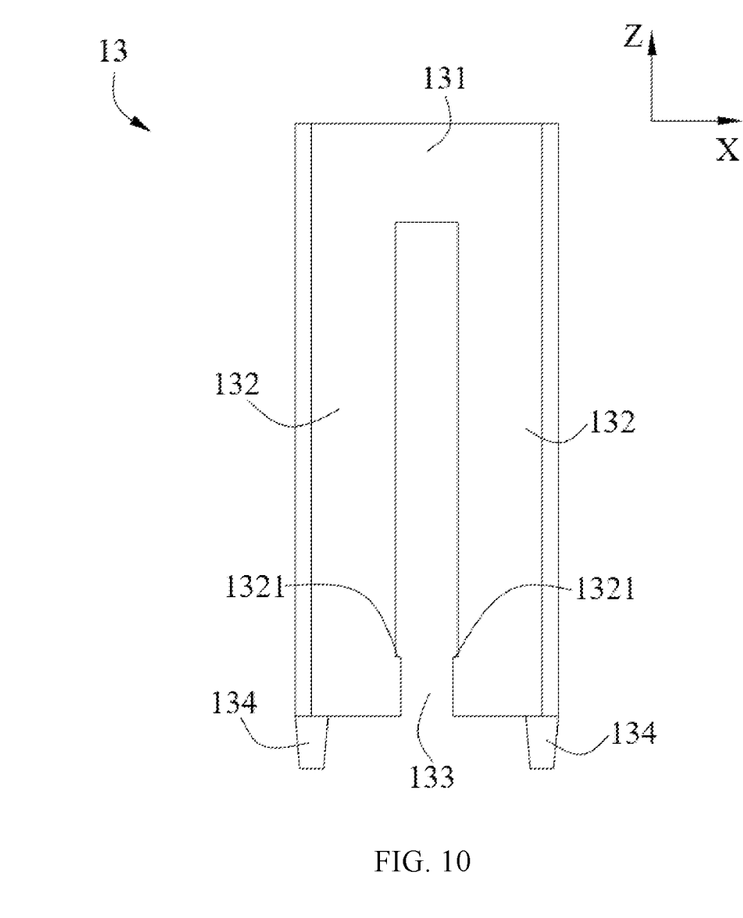
FIG. 10 is a main view of FIG. 9.

Referring to FIG. 4, each second partition 12 may have a second body portion 121 and a connection portion 122. The connection portion 122 is located between the first partition 11 and the second body portion 121 in the first direction X, and a first cavity 1222 is provided in the connection portion 122. Referring to FIG. 4, FIG. 9, and FIG. 10, the securing clip 13 may have a third body portion 131 and two extension portions 132. Each extension portion 132 is connected to the third body portion 131 and extends in a third direction Z, and the two extension portions 132 are spaced apart in the first direction X and form a groove 133 together with the third body portion 131, that is, the securing clip 13 forms a U-shaped structure.

Referring to FIG. 3, FIG. 4, FIG. 6, and FIG. 7, the third body portion 131 of the securing clip 13 is located above the connection portions 122 of the two second partitions 12, the two extension portions 132 are accommodated in respective first cavities 1222 formed by the connection portions 122 of the two second partitions 12, and the first partition 11 passes through the groove 133 in the second direction Y. In other words, the securing clip 13 fits with the two second partitions 12 through insertion. This fitting manner not only facilitates quick assembly, but also limits movement of the two second partitions 12 relative to the first partition 11 in the first direction X and the second direction Y under a clamping force applied to the two second partitions 12 by the two extension portions 132 of the securing clip 13, thereby improving the strength of connection between the second partitions 12 and the first partition 11.

Figure 6:
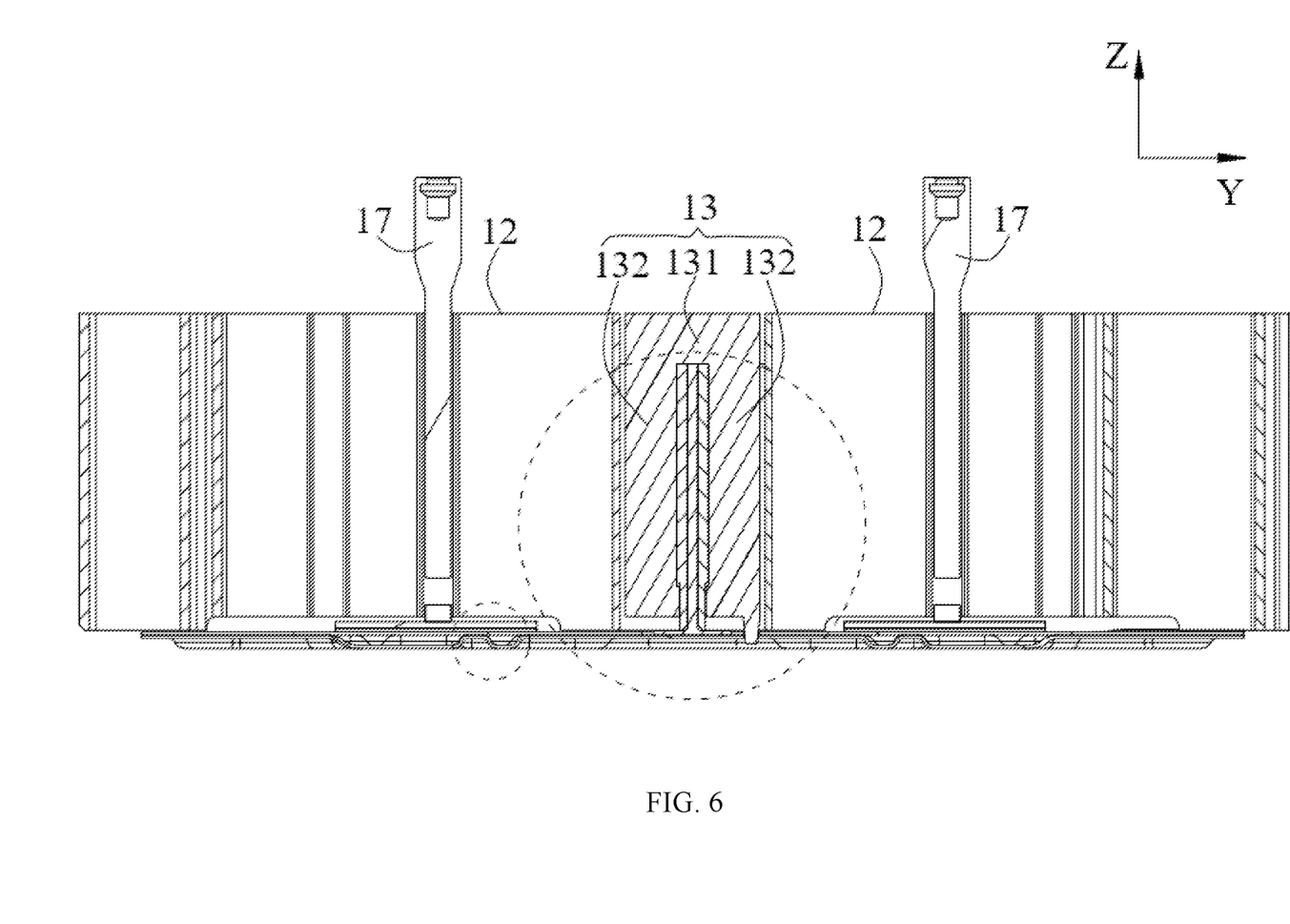
FIG. 6 is a cross-sectional view taken along a line A-A in FIG. 3.
Figure 7:
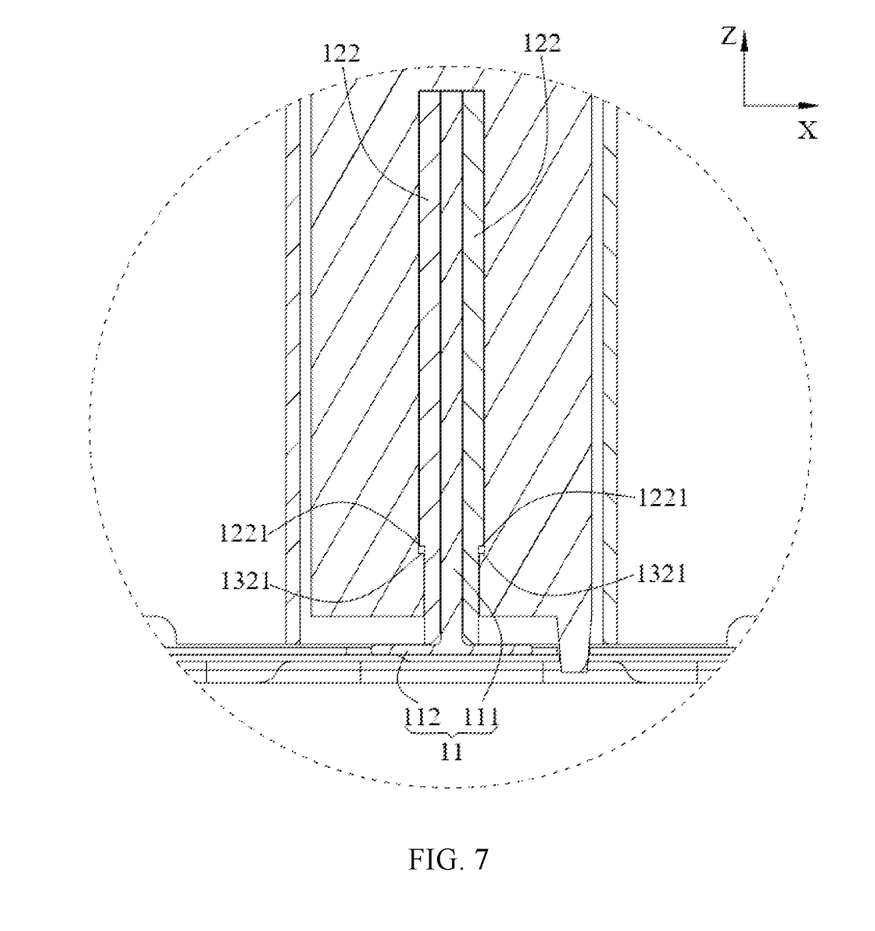
FIG. 7 is an enlarged view of a large circled part in FIG. 6.

Referring to FIG. 6 and FIG. 7, a second stepped surface 1221 is formed inside the first cavity 1222 of the connection portion 122 of each second partition 12 (that is, the second stepped surface 1221 is a part of the inner wall surface of the connection portion 122, where the inner wall surface encircles to form the first cavity 1222). A first stepped surface 1321 is formed inside each extension portion 132 of the securing clip 13, and the first stepped surface 1321 abuts against the second stepped surface 1221 in the third direction Z. Herein, fitting between the first stepped surface 1321 and the second stepped surface 1221 limits movement of the two second partitions 12 relative to the first partition 11 in the third direction Z, thereby improving the strength of connection between the second partitions 12 and the first partition 11.

Referring to FIG. 3 and FIG. 4, a notch is provided in a part, corresponding to the securing clip 13, of the first partition 11, and the third body portion 131 of the securing clip 13 is accommodated in the notch. In this case, a wall surface, forming the notch 113, of the first partition 11 clamps the third body portion 131 of the securing clip 13, so as to limit movement of the securing clip 13 in the second direction Y, and further limit movement of the two second partitions 12 relative to the first partition 11 in the second direction Y.

In order not to increase the size of the battery module in the third direction Z, preferably, the securing clip 13 does not protrude from the notch 113 of the first partition 11 in the third direction Z.

Referring to FIG. 3 and FIG. 4, the heat exchange plate 14 is located below the first partition 11 in the third direction Z and is formed with a channel 141, and the heat exchange plate 14 fits with the securing clip 13 to be mounted to the securing clip 13. A heat-conducting medium is disposed in the channel 141, thereby implementing heat exchange between the heat exchange plate 14 and the plurality of batteries 2.

Referring to FIG. 4 to FIG. 7, a mounting slot 142 is provided in the heat exchange plate 14, and the first partition 11 may have a first body portion 111 and a mounting portion 112. The first body portion 111 of the first partition 11 extends in the third direction Z, and the mounting portion 112 is connected to the first body portion 111, extends in the first direction X, and is accommodated in the mounting slot 142. Herein, fitting between the mounting portion 112 of the first partition 11 and the mounting slot 142 of the heat exchange plate 14 facilitates quick mounting of the heat exchange plate 14 to the securing clip 13, thereby improving assembly efficiency of the battery module.

Figure 8:
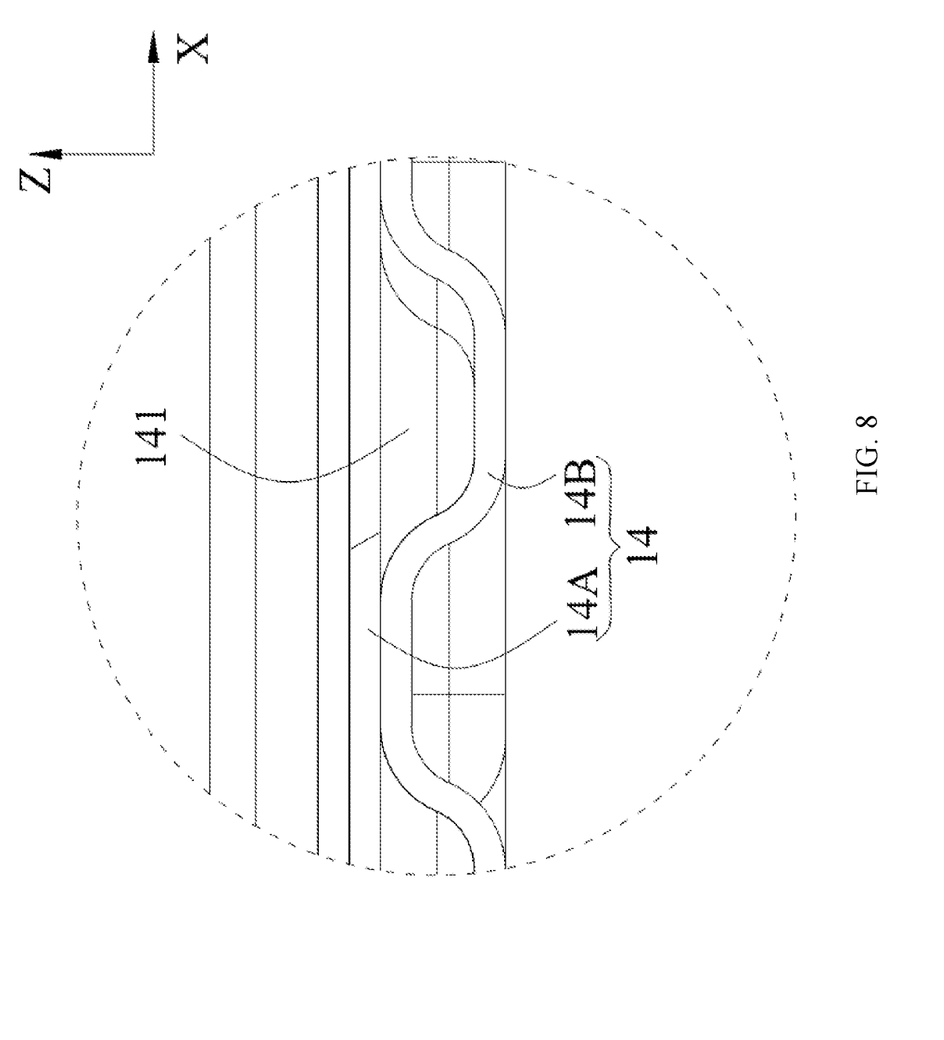
FIG. 8 is an enlarged view of to a small circled part in FIG. 6.

Referring to FIG. 6 to FIG. 8, the heat exchange plate 14 may include a first plate 14A and a second plate 14B. The second plate 14B is located below the first plate 14A in the third direction Z and forms the channel 141 together with the first plate 14A, and the second plate 14B is formed as a wave-like structure.

Referring to FIG. 5 to FIG. 9, the heat exchange plate 14 may have position locking holes 143. The securing clip 13 may further have position locking portions 134, the position locking portion 134 is disposed below the extension portion 132 in the third direction Z, and the position locking portion 134 is accommodated in the position locking hole 143 of the heat exchange plate 14. Herein, disposition of the position locking hole 143 and the position locking portion 134 provides a guide for the mounting of the heat exchange plate 14 and the securing clip 13, thereby not only improving assembly efficiency of the battery module, but also limiting movement of the heat exchange plate 14 relative to the securing clip 13 in the first direction X and the second direction Y. In this way, the overall structural strength of the battery module is improved.

In order to facilitate quick insertion of the position locking portion 134 into the position locking hole 143 to fit with the position locking hole 143, the position locking portion 134 may be formed as a tapered structure, and correspondingly the position locking hole 143 is formed as a tapered hole.

Referring to FIG. 9 and FIG. 10, the position locking portions 134 of the securing clip 13 may be disposed in pairs, and specifically one or more pairs of the position locking portions 134 may be disposed. A pair of position locking portions 134 are respectively disposed below the two extension portions 132, and the pair of position locking portions 134 are staggered in the first direction X. This staggered disposition of the position locking portions 134 is conducive to limiting a mounting position of the heat exchange plate 14 relative to the securing clip 13 in the first direction X and the second direction Y, thereby facilitating quick mounting of the heat exchange plate 14 to the securing clip 13. In this way, assembly efficiency of the battery module is improved. Certainly, the pair of position locking portions 134 may alternatively be disposed in parallel in the first direction X.

Referring to FIG. 3 and FIG. 4, a second cavity 1211 may be provided in the second body portion 121 of the second partition 12. The connector 17 is secured to the heat exchange plate 14 and communicates with the channel 141 of the heat exchange plate 14, and the connector 17 protrudes from the second cavity 1211 of the second body portion 121 of the second partition 12. The connector 17 is configured to communicate with an external heat-conducting medium storage apparatus, so that the heat-conducting medium circulates in the channel 141 of the heat exchange plate 14 and the heat-conducting medium storage apparatus through the connector 17 to exchange heat with the plurality of batteries 2.

Finally, a supplementary description of an assembly process of the framework assembly 1 of the battery module is provided: 1. dispose the two second partitions 12 against each other in the middle; 2. insert the two extension portions 132 of the securing clip 13 into the first cavities 1222 of the connection portions 122 of the two second partitions 12; 3. move the two second partitions 12 to two sides respectively in the first direction X; 4. insert the first partition 11 into the groove 133 of the securing clip 13 in the second direction Y, where in this case, the two extension portions 132 of the securing clip 13 clamp the two second partitions 12 and the first partition 11 together, so as to firmly secure the two second partitions 12 to the first partition 11, completing assembly of the securing clip 13 with the two second partitions 12 and the first partition 11; 5. first connect the connector 17 to the heat exchange plate 14, and then fit the two to the foregoing assembled structure as a whole from the lower part of the first partition 11; and 6. place the batteries 2, and mount the two side plates 15 and the two end plates 16. In this way, assembly of the battery module is completed.

Another embodiment of this application provides a battery pack including the foregoing battery module. The battery pack may include one or more battery modules, to provide a higher voltage and capacity.

Another embodiment of this application further provides a powered device including the foregoing battery module. Batteries of the battery module may be used as a power supply of the powered device, or may be used as an energy storage unit of the powered device. Examples of the powered device may be a drone, an energy storage cabinet, a ship, a vehicle, and the like. The vehicle may be a new energy vehicle, including but not limited to a full electric vehicle, a hybrid electric vehicle, a plug-in hybrid electric vehicle, an electric bicycle, an electric scooter, an electric golf vehicle, an electric truck, an electric train, and the like. The vehicle is provided with a drive motor, and the drive motor is electrically connected to the battery module and fed with electric energy by the batteries of the battery module. The drive motor is connected to wheels of the vehicle through a transmission mechanism to drive the vehicle.

Another embodiment of this application provides an assembly method for a battery module, where the assembly method is applied to the battery module provided in the foregoing embodiment. The method includes the following steps:

providing a plurality of batteries 2 and a framework assembly 1, where the framework assembly 1 includes a first partition 11, two second partitions 12, and a securing clip 13; placing the first partition 11 in a second direction Y; mounting the second partitions 12 respectively on two sides of the first partition 11 in a first direction X, where the second partitions 12 form a cross-shaped structure together with the first partition 11; fitting the securing clip 13 to the two second partitions 12 and the first partition 11, so that the securing clip 13 secures the two second partitions 12 to the first partition 11; and disposing the plurality of batteries 2 on two sides of each second partition 12 in the second direction Y.

In some embodiments, a first cavity 1222 is provided in each second partition 12, and the securing clip 13 has two extension portions 132 and a groove 133 located between the two extension portions 132. The two extension portions 132 of the securing clip 13 are inserted into respective cavities 1222 of the two second partitions 12. The first partition 11 is inserted into the groove 133.

In some embodiments, a heat exchange plate 14 is provided, and the heat exchange plate 14 is connected below the first partition 11 in a third direction Z, where a channel is formed in the heat exchange plate 14.

In some embodiments, a connector 17 is further provided, and the connector 17 is connected to the heat exchange plate 14, where the connector 17 communicates with the channel.

What is claimed is:

1. A battery module, comprising a plurality of batteries and a framework assembly, wherein the framework assembly comprises a first partition, two second partitions, and a securing clip; and, wherein the first partition extends in a second direction;

each second partition extends in a first direction, and the two second partitions are located respectively on two sides of the first partition in the first direction and form a cross-shaped structure together with the first partition;

the securing clip fits with the two second partitions and secures the two second partitions to the first partition; and the plurality of batteries are disposed on two sides of each second partition of the framework assembly in the second direction; and, wherein each second partition has a second body portion and a connection portion, the connection portion is located between the first partition and the second body portion in the first direction, and a first cavity is formed in the connection portion;

the securing clip has a third body portion and two extension portions, each extension portion is integrally connected to the third body portion and extends in a third direction, and the two extension portions are spaced apart in the first direction and form a groove together with the third body portion; and the third body portion is located above the connection portions of the two second partitions, the two extension portions are entirely inserted in respective first cavities of the connection portions of the two second partitions, and the first partition passes through the groove in the second direction, wherein a height of the connection portions is lower than the second body portions in a third direction, and a height of the securing clip is the same as the height of the second body portion in the third direction.

2. The battery module according to claim 1, wherein:
a second stepped surface is formed inside the first cavity of the connection portion; and
a first stepped surface is formed inside each extension portion, and the first stepped surface abuts against the second stepped surface in the third direction.

3. The battery module according to claim 1, wherein a notch is provided in a part of the first partition corresponding to the securing clip, and the third body portion of the securing clip is accommodated in the notch.

4. The battery module according to claim 1, wherein:
the framework assembly further comprises a heat exchange plate, the heat exchange plate is located below the first partition in the third direction, and a channel is formed in the heat exchange plate; and
the securing clip fits with the heat exchange plate and mounts the heat exchange plate.

5. The battery module according to claim 4, wherein:
the first partition has a first body portion and a mounting portion, the first body portion extends in the third direction, and the mounting portion is connected to the first body portion and extends in the first direction; and
a mounting slot is provided in the heat exchange plate, and the mounting slot accommodates the mounting portion of the first partition.

6. The battery module according to claim 4, wherein a heat exchange plate comprises a first plate and a second plate, the second plate is located below the first plate in the third direction and forms the channel together with the first plate, and the second plate is formed as a wave-like structure.

7. The battery module according to claim 4, wherein
the heat exchange plate has position locking holes; and
the securing clip further has one or more position locking portions, each position locking portion disposed below the extension portion in the third direction and the position locking portion is accommodated in the position locking hole of the heat exchange plate.

8. The battery module according to claim 7, wherein the position locking portion is formed as a tapered structure.

9. The battery module according to claim 7, wherein the position locking portions are disposed in pairs, a pair of position locking portions are respectively disposed below the two extension portions, and the pair of position locking portions are staggered in the first direction.

10. The battery module according to claim 4, wherein the framework assembly further comprises a connector, the connector is secured to the heat exchange plate, and the connector is configured to connect the channel to an external heat-conducting medium storage apparatus.

11. A battery pack, comprising a battery module that has a plurality of batteries and a framework assembly, wherein the framework assembly comprises a first partition, two second partitions, and a securing clip; and, wherein
the first partition extends in a second direction;
each second partition extends in a first direction, and the two second partitions are located respectively on two sides of the first partition in the first direction and form a cross-shaped structure together with the first partition;
the securing clip fits with the two second partitions and secures the two second partitions to the first partition; and
the plurality of batteries are disposed on two sides of each second partition of the framework assembly in the second direction; and, wherein
each second partition has a second body portion and a connection portion, the connection portion is located between the first partition and the second body portion in the first direction, and a first cavity is formed in the connection portion;
the securing clip has a third body portion and two extension portions, each extension portion is integrally connected to the third body portion and extends in a third direction, and the two extension portions are spaced apart in the first direction and form a groove together with the third body portion; and
the third body portion is located above the connection portions of the two second partitions, the two extension portions are entirely inserted in respective first cavities of the connection portions of the two second partitions, and the first partition passes through the groove in the second direction, wherein a height of the connection portions is lower than the second body portions in a third direction, and a height of the securing clip is the same as the height of the second body portion in the third direction.

12. The battery pack according to claim 11, wherein
a second stepped surface is formed inside the first cavity of the connection portion; and
a first stepped surface is formed inside each extension portion, and the first stepped surface abuts against the second stepped surface in the third direction.

13. The battery pack according to claim 11, wherein a notch is provided in a part of the first partition corresponding to the securing clip, and the third body portion of the securing clip is accommodated in the notch.

14. The battery pack according to claim 11, wherein
the framework assembly further comprises a heat exchange plate, the heat exchange plate is located below the first partition in the third direction, and a channel is formed in the heat exchange plate; and
the securing clip fits with the heat exchange plate, so as to mount the heat exchange plate.

15. The battery pack according to claim 14, wherein
the first partition has a first body portion and a mounting portion, the first body portion extends in the third direction, and the mounting portion is connected to the first body portion and extends in the first direction; and
a mounting slot is provided in the heat exchange plate, and the mounting slot accommodates the mounting portion of the first partition.

16. The battery pack according to claim 14, wherein the heat exchange plate comprises a first plate and a second plate, the second plate is located below the first plate in the third direction and forms the channel together with the first plate, and the second plate is formed as a wave-like structure.

17. The battery pack according to claim 14, wherein
the heat exchange plate has position locking holes; and
the securing clip further has one or more position locking portions, each position locking portion is disposed below the extension portion in the third direction, and the position locking portion is accommodated in the position locking hole of the heat exchange plate.

18. An assembly method for a battery module, comprising:
providing a plurality of batteries and a framework assembly, wherein the framework assembly comprises a first partition, two second partitions, and a securing clip;
placing the first partition in a second direction;
mounting the second partitions respectively on two sides of the first partition in a first direction, wherein the second partitions form a cross-shaped structure together with the first partition;

fitting the securing clip to the two second partitions and the first partition, so that the securing clip secures the two second partitions to the first partition; and disposing the plurality of batteries on two sides of each second partition in the second direction; and, wherein each second partition has a second body portion and a connection portion, the connection portion is located between the first partition and the second body portion in the first direction, and a first cavity is formed in the connection portion;

the securing clip has a third body portion and two extension portions, each extension portion is connected to the third body portion and extends in a third direction, and the two extension portions are spaced apart in the first direction and form a groove together with the third body portion; and the third body portion is located above the connection portions of the two second partitions, the two extension portions are entirely inserted in respective first cavities of the connection portions of the two second partitions, and the first partition passes through the groove in the second direction, wherein a height of the connection portions is lower than the second body portions in a third direction, and a height of the securing clip is the same as the height of the second body portion in the third direction.

\* \* \* \* \*